United States Patent [19]

Chen

[11] Patent Number: 5,841,776
[45] Date of Patent: Nov. 24, 1998

[54] APPARATUS AND METHOD FOR A HIGH THROUGHPUT FIBER-OPTIC ACCESS NETWORK USING CODE DIVISION MULTIPLE ACCESS

[75] Inventor: Howard Zehua Chen, Berkeley Heights, N.J.

[73] Assignee: Lucent Technologies Inc., Murray Hill, N.J.

[21] Appl. No.: 581,700

[22] Filed: Dec. 29, 1995

[51] Int. Cl.$^6$ ........................................... H04J 13/00
[52] U.S. Cl. ................... 370/441; 370/479; 371/43.1; 375/303
[58] Field of Search ................................... 370/312, 204, 370/319, 212, 320, 213, 335, 342, 441, 479; 375/200, 202, 205, 265, 272, 303, 264, 341; 359/135, 136; 371/43.1, 43.4

[56] References Cited

U.S. PATENT DOCUMENTS

| | | | |
|---|---|---|---|
| 4,905,003 | 2/1990 | Helferich | 341/110 |
| 5,206,882 | 4/1993 | Schloemer | 370/335 |
| 5,465,267 | 11/1995 | Todoroki | 375/279 |
| 5,499,236 | 3/1996 | Giallorenzi et al. | 370/441 |
| 5,500,856 | 3/1996 | Nagase et al. | 370/441 |
| 5,511,096 | 4/1996 | Huang et al. | 375/265 |
| 5,623,485 | 4/1997 | Bi | 370/209 |

OTHER PUBLICATIONS

Viterbi, A.J., "A Processing Satellite Transponder for Multiple Access by Low–Rate Multiple Users," Digital Satellite Communications Conference, Montreal, Oct. 23–25, 1978.

Goodman, D.J. et al., "Frequency–Hopped Multilevel FSK for Mobile Radio", 59 B.S.T.J. pp. 1257–1275, 1980.

*Primary Examiner*—Chi H. Pham
*Assistant Examiner*—Kwang B. Yao

[57] ABSTRACT

A method and apparatus for implementation of a code division multiple access encoding scheme in a fiber-optic network. One preferred embodiment of the present invention provides an encoder and decoder for each terminal in the communications network, for example SONET OC-3, and allows each terminal to transmit their signals into the fiber-optic network at random. Because no time slot management is used, signals from all terminals interfere with one another. A coding technique is used by each decoder to sort its own signal out of this interference. The encoded data from each terminal is modulated with a technique known as MFSK (multiple frequency shift keying). The modulated signal is further used to intensity-modulate a semiconductor laser diode which may or may not be a single wavelength laser. At the receiver, the combined interference signal is first detected by a optical intensity detector and then sent to a frequency tone detectors which demodulate the MFSK signal. The output of the MFSK demodulator is then sent to a decoder where the original data bits are recovered. The network employs an optimum spread spectrum multiple access coding and modulation method that hops the subcarrier of a semiconductor laser diode over the entire range of DC –30 Ghz. Powerful concatenated Reed-Solomon outer, dual-K convolutional inner codes are used to minimize errors caused by mutual interference.

21 Claims, 4 Drawing Sheets

APPARATUS AND METHOD FOR A HIGH THROUGHPUT FIBER-OPTIC ACCESS NETWORK USING CODE DIVISION MULTIPLE ACCESS

FIELD OF THE INVENTION

The present invention relates generally to communications networks and more specifically, to a new coding and modulation scheme for fiber-optic communications networks with high bit rate terminals.

BACKGROUND OF THE INVENTION

Existing fiber-optic communications networks are typically based on a time-sharing technique whereby a central controller assigns time slots in a time frame to different terminals. A great many network protocols for time-sharing within such networks have been designed, where these protocols are known as time division multiple access (TDMA) protocols. TDMA methods are effective when the bit rates of individual terminals in the network are relatively low (e.g., <10 Mbits/sec in Ethernet) and their numbers are relatively small (e.g., <100).

A standard implementation of such a TDMA approach used in fiber-based networks is known as SONET (synchronous optical network). SONET uses a simple time multiplexing technique to accommodate increasing number of SONET terminals. For example, OC-1 (Optical Carrier-1) SONET supports data transmission at 51.84 Mbits/s, and OC-3 supports 3 times OC-1 at 155.52 Mbps. Currently, the highest level SONET is the OC-192 which is 192 times OC-1 at 9.95328 Gbits/s. Physical limitations on photonic devices and manufacturing difficulties are two main factors for this limit. For example, in an OC-192 SONET ring, all laser diodes must be modulated by an injection current signal at 10 Gbps which is a very difficult task. In addition, because of electronic packaging difficulties, direct current modulation of semiconductor lasers is not expected to go much higher than 10 Gbps. All other components such as optical receivers and electronic multiplexers and demultiplexers have similar difficulties.

OC-3 bit rate has been selected by ATM (asynchronous transfer mode) bodies as the preferred physical link between ATM terminals. AT&T, for example, provides OC-3 rate ATM services known as InterSpan 155. In order to network a large number of OC-3 (155.52 Mbps) ATM compatible computer terminals with TDMA technology, every access station is required to generate a very high bit rate super frame 10 in which each station uses a fraction of the available time slots, as shown in FIG. 1. Currently, OC-192 (9.95328 Gbps) is the highest speed SONET ring technology that can multiplex no more than 64 OC-3 links with perfect timing and no guard time. Thus, because fundamental and practical limitations limit SONET to OC-192, when there are n>64 OC-3 terminals that need to be connected to a network, at least 2 separate OC-192 networks must be used, resulting in high network costs that will be charged to the customers in the form of higher access charge per terminal.

Another shortcoming of the TDMA-based approach is the fact that statistical multiplexing cannot be implemented easily in this type of approach. For example, although an OC-192 network should be able to support about 128 OC-3 terminals if at any given time only one half of them are active, in practice this cannot be done without another statistical multiplexer operating at the rate of 10 Gbit/s (OC-192). Still another disadvantage of the TDMA-based approach is the well-known fact that high bit rate systems exhibit low reliability for a variety of reasons. For example, heat-sinking of a 10 Gbits/circuit is itself a subject under study. Accordingly, there is a need for an improved multiple access system that enables a larger number of high bit rate terminals to be connected to a network while still having a high reliability.

SUMMARY OF THE INVENTION

The present invention discloses a novel method and apparatus for implementation of a code division multiple access encoding scheme in a fiber-optic network. One preferred embodiment of the present invention provides an encoder and decoder for each terminal in the communications network, for example SONET OC-3, and allows each terminal to transmit their signals into the fiber-optic network at random. Because no time slot management is used, signals from all terminals interfere with one another. A coding technique is used by each decoder to sort its own signal out of this interference. The encoded data from each terminal is modulated with a technique known as MFSK (multiple frequency shift keying). The modulated signal is further used to intensity-modulate a semiconductor laser diode which may or may not be a single wavelength laser.

At the receiver, the combined interference signal is first detected by a optical intensity detector and then sent to a frequency tone detectors which demodulate the MFSK signal. The output of the MFSK demodulator is then sent to a decoder where the original data bits are recovered. The network employs an optimum spread spectrum multiple access coding and modulation method that hops the subcarrier of a semiconductor laser diode over the entire range of DC –30 Ghz. Powerful concatenated Reed-Solomon outer, dual-K convolutional inner codes are used to minimize errors caused by mutual interference.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

The present invention discloses a method and apparatus for implementation of a novel CDMA (code division multiple access) coding scheme in a fiber-optic network. Code division multiple access (CDMA) is a spread spectrum technique that intentionally mixes signals from all simultaneous users in order to separate them in a commonly shared channel. Though seemingly counter-intuitive, CDMA offers many attractive features not available in TDMA. One situation where spread spectrum can be advantageous is in the networking of very high bit rate computer terminals, particularly when the performance of a TDMA system has already been pushed to the limit by fundamental physics.

Figure 1:
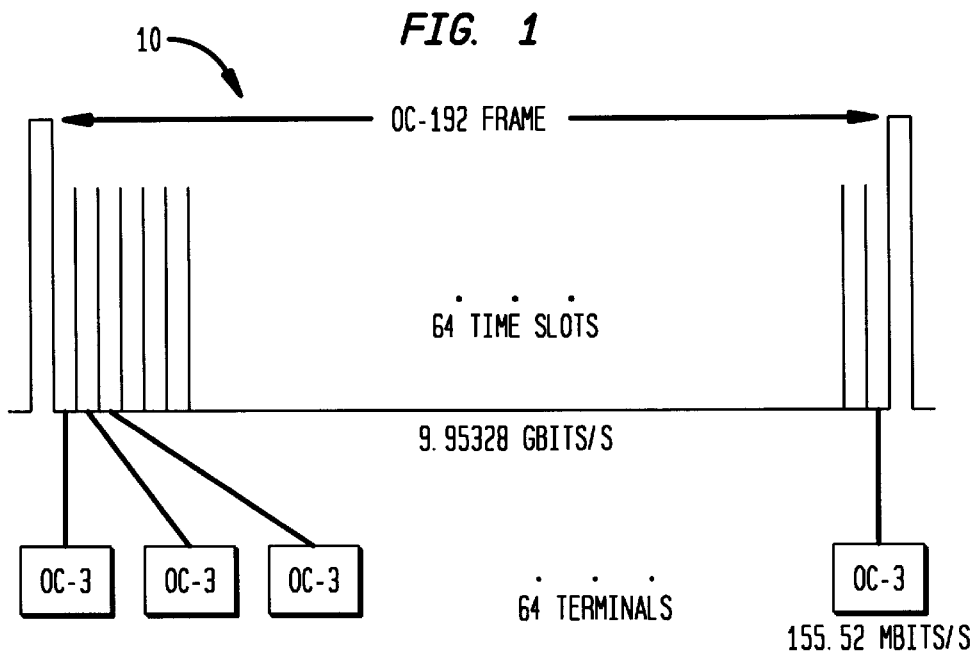
FIG. 1 shows an exemplary superframe for time division multiplexing of 64 OC-3 SONET terminals with OC-192.
Figure 2A:
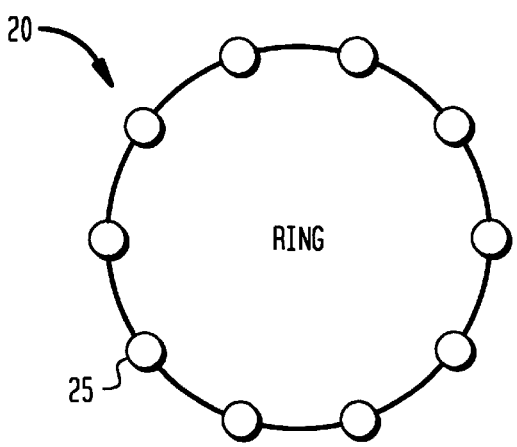
FIGS. 2A and 2B show exemplary representations of multiple access network structures used with the present invention.
Figure 2B:
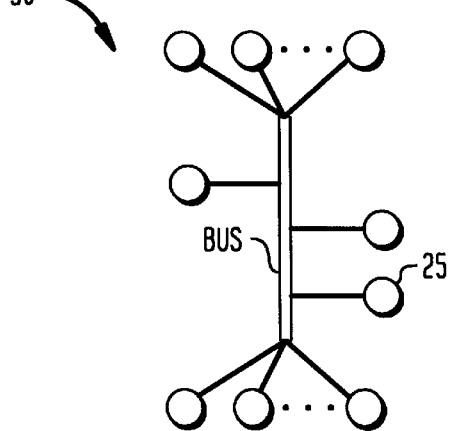

Referring to FIGS. 2A and 2B, there are shown exemplary embodiments of a multiple access ring network structure 20 and a bus network structure 30 used in connection with the present invention. As would be understood by a person skilled in the art, other network configurations may also be used in conjunction therewith. Each network structure includes a multiplicity M of network user terminals 25 which transmit and receive data at a specified data rate R bps, for example, 155.52 Mbps of OC-3. Accordingly, in the following discussion, the de facto standard of OC-3 will be focused upon although the methods developed are equally well suited to other rate SONETs.

Although there are a total of M users connected to the network structures 20,30, at a specific time, only $\alpha M$ ($\alpha \leq 1$) users are active. If the duty cycle of the source is $\beta$ (for voice transmissions $\beta=0.4$), then the total number of colliding data symbols in the present invention CDMA implementation is $m=\beta\alpha M$. In the following discussion, the multiple access problem for m is analyzed in terms of the present invention. A statistical distribution for m can be used to obtain time-averaged results. Because the performance of a CDMA system is interference limited and because the fiber in the fiber-optic system is virtually noise-free, the effect of noise in the following analysis can be neglected.

Figure 3:
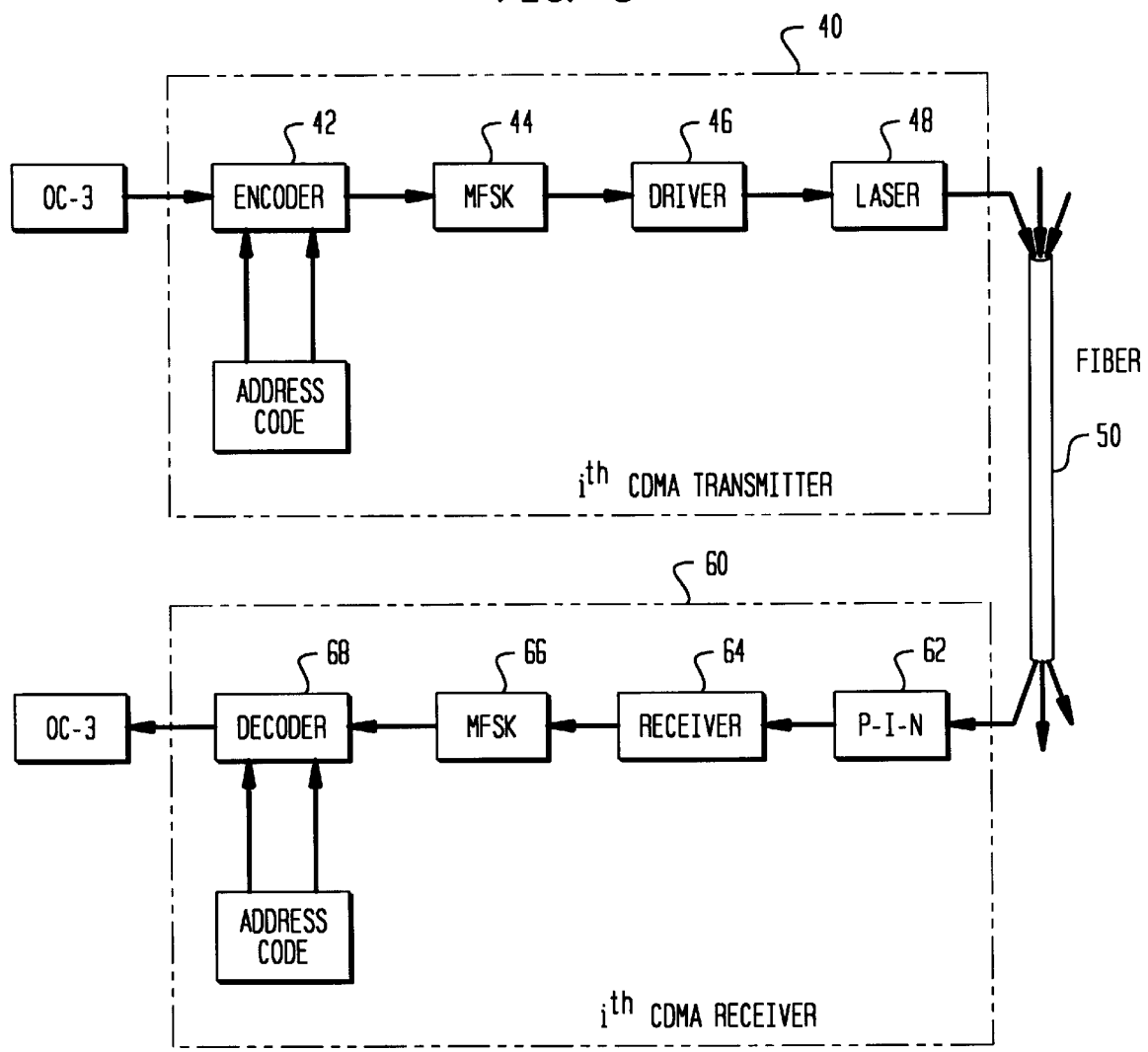
FIG. 3 shows a block diagram for a CDMA-based fiber optic network in accordance with the present invention.

Referring to FIG. 3, there is shown one preferred higher level embodiment of a CDMA transmitter 40 and CDMA receiver 60 in accordance with the present invention. As shown, each SONET terminal in the network generates data in the form of ATM cells or any other form of data packet (units) which enter the CDMA transmitter 40 at the OC-3 rate. The data is received at an encoder 42 where an address code is encoded with the transmitted data. The encoded data from the encoder is then modulated with a technique known as MFSK (multiple frequency shift keying 44). The modulated signal is next input to a driver 46 and further used to intensity-modulate a semiconductor laser diode 48 which may or may not be a single wavelength laser. The user signals from each of the i active CDMA transmitters 40 in the network are then transmitted at random over the fiber-optic network 50. Thus, a main difference between the present invention CDMA coding scheme and the existing TDMA approaches is that multiple access is accomplished by allowing all user signals to collide, instead of assigning them to orthogonal time slots where the signals will never collide.

At the receiver 60, the combined interference signal is first detected by an optical intensity detector, for example, in the form of a PIN diode 62 and accompanying receiver 64, and then sent to frequency tone detectors 66 which demodulate the MFSK signal. The output of the MFSK demodulator is then sent to a decoder 68 where the original data bits are recovered where they are then forwarded via OC-3 to the SONET terminal.

Figure 4:
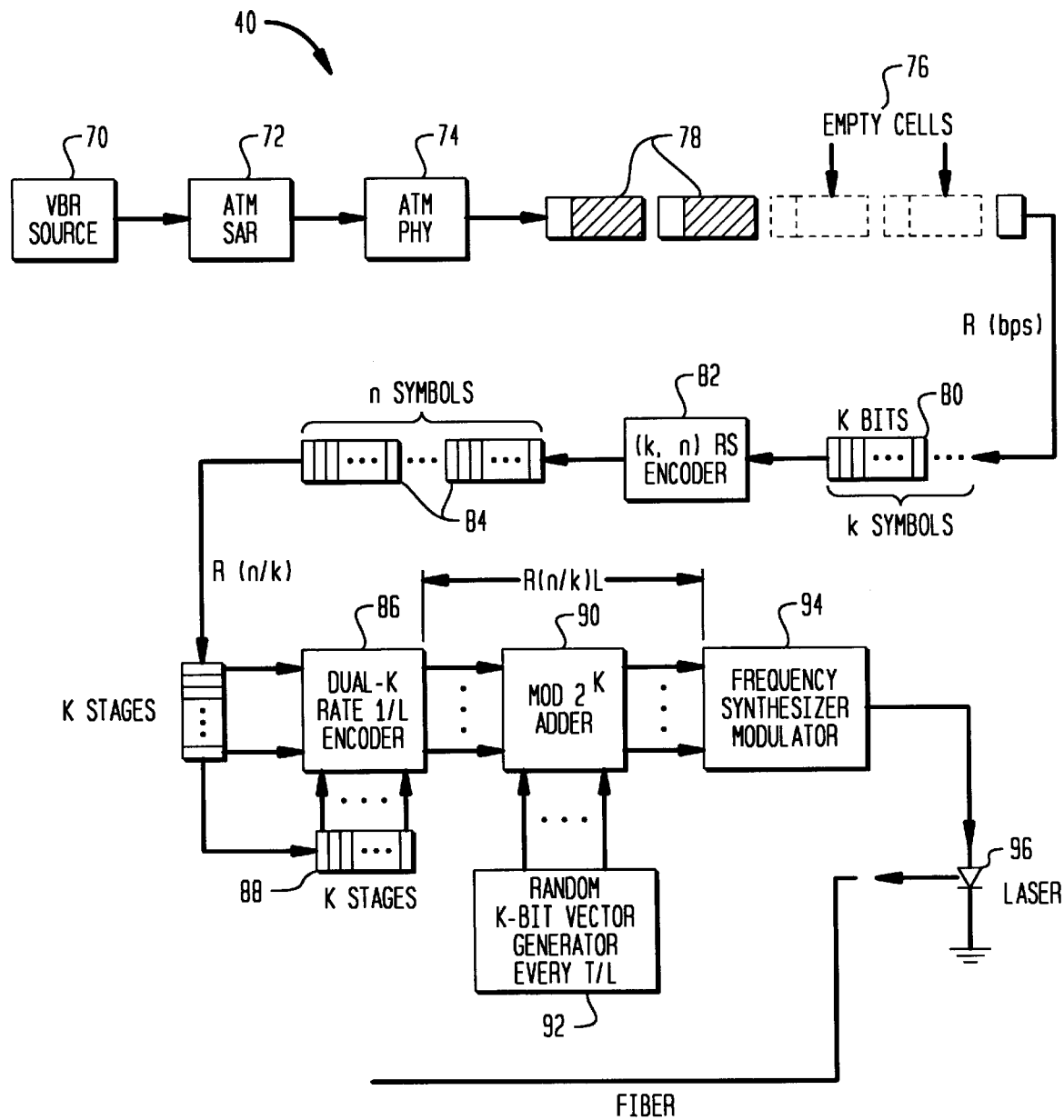
FIG. 4 shows a detailed block diagram of CDMA transmitter in accordance with the present invention.
Figure 5:
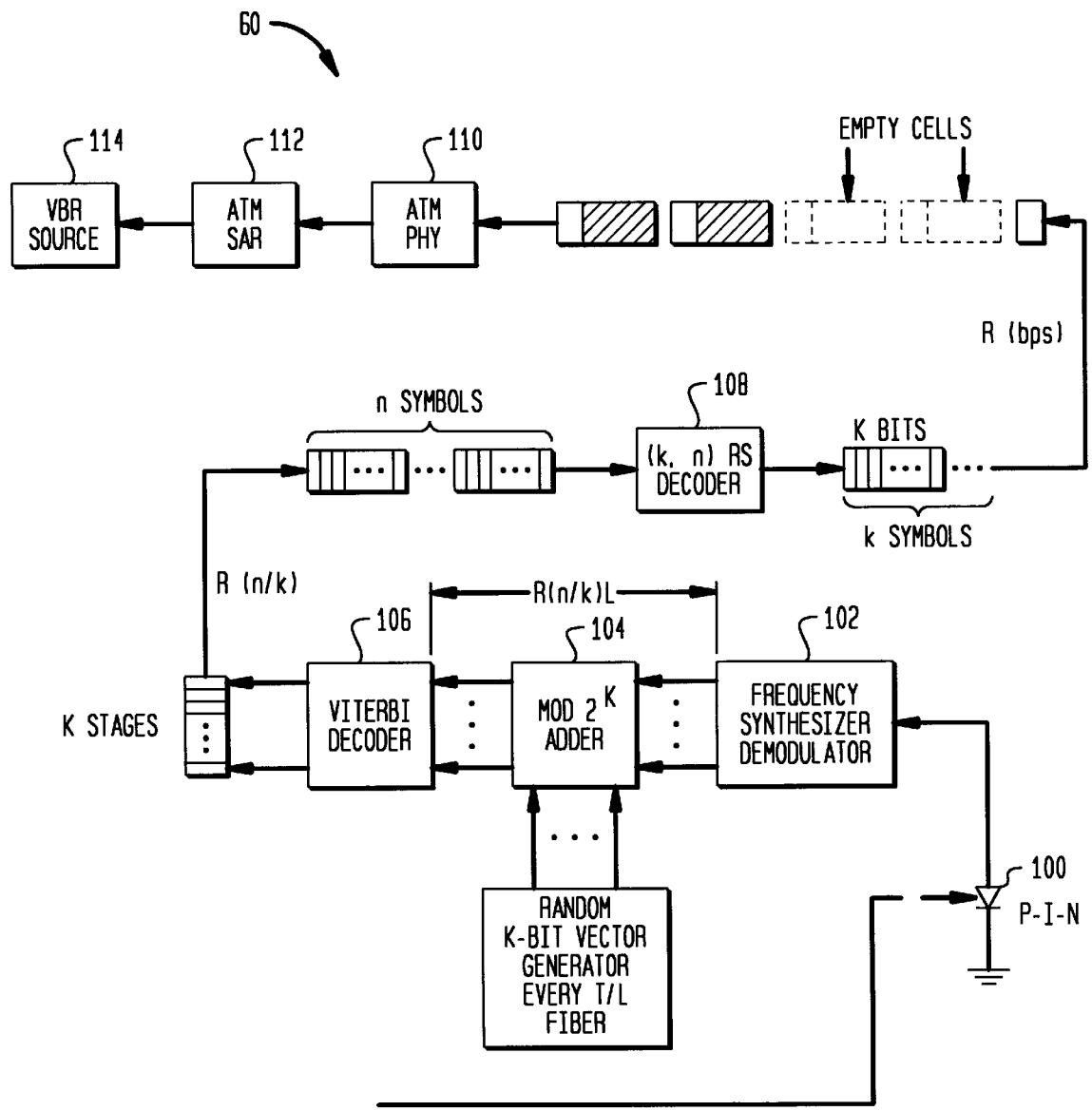
FIG. 5 shows a detailed block diagram of CDMA receiver in accordance with the present invention.

Referring to FIG. 4, a detailed circuit description is shown for one preferred embodiment of the CDMA transmitter 40 in accordance with the present invention. As shown, a terminal which appears to the network as a variable bit rate source 70 emits a bit stream of data. As would be understood by one skilled in the art, this bit stream is segmented and assembled into ATM cells by means, for example, of an ATM segmentation and reassembly (SAR) circuit 72. Each SONET terminal then, emits a stream of ATM cells from the physical layer 74, producing some empty cells 76 and some non-empty cells 78. The non-empty ATM cells 78 are then segmented sequentially into K-bit source symbols 88. An (nk) Reed-Solomon (RS) encoder 82 next maps k of the K-bit symbols into n symbols 84. Each Reed-Solomon encoded K-bit symbol is then fed into a dual-K, rate 1/L convolution encoder 86 that outputs a total of L different K-bit symbols in a K-bit time period. As would be understood, the input to the convolutional encoder includes K-stages 88. Each of L symbols is then modulo-$2^K$ added to a component of a terminal code address randomly chosen over the Galois field $GF(2^K)$ at a modulo adder 90. As shown in FIG. 3, the terminal code address is obtained from a K-bit vector generator 92 every T/L time periods where T represents a predetermined time period. The output of the adder 90 is then converted in a frequency synthesizer modulator 94 to one of $2^K$ orthogonal frequency tones which is then used to current-modulate a semiconductor laser diode 96. Note that for a bit period of $\tau$, the chip period (hop time) is $(K/L)\tau$.

Referring to FIG. 4, in accordance with the present invention, there is shown a detailed description of the CDMA receiver 60. At the receiver end, an optical receiver including, for example, a PIN diode 100 and a frequency synthesizer demodulator 102, demodulates the frequency tones and sends the signal to a decoding matrix which again in the preferred embodiment includes a modulo-$2^K$ adder 104. A Viterbi decoder 106 and (n,k) Reed-Solomon decoder 108 perform decoding functions to recover the baseband information in the form of K-bit symbols. The recovered information is then passed onto the ATM physical layer 110, ATM SAR 112 and VBR source 114.

The symbol error rate for the dual-K coded MFSK system has been derived by Viterbi, in "A Processing Satellite Transponder for Multiple Access by Low-Rate Mobile Users," A. J. Viterbi, Digital Satellite Communications Conference, Montreal, Oct. 23–25, 1978 and is given by:

$$P_{su} < \frac{1}{2} (2^K - 1) \frac{p^{2L}}{[1 - Lp^{L-1} - (2^K - 1 - L)p^L]^2} \quad (1)$$

where $p=1-(-2^{-K})^{m-1}$. If an (n,k), t-error correcting R-S code is used, the average coded symbol error rate is given by:

$$P_{sc} = \frac{1}{n} \sum_{i=\tau+1}^{n} i \binom{n}{i} P_{su}^i (1 - P_{su})^{n-i} \quad (2)$$

wherein $$\binom{n}{i}$$

means "n choosing i" in standard probability theory. The coded bit error rate is thus $$P_b = \frac{2^{K-1}}{2^K - 1} P_{sc}.$$

Therefore, with the modification of $R_b \rightarrow (n/k)R_b$, an optimum (K,L) can be found using a method outlined in "Frequency-Hopped Multilevel FSK for Mobile Radio," by D. J. Goodman, P. S. Henry, and V. K. Prabhu, B.S.T.J., 59, pp. 1257–1275, 1980. For a given bandwidth W, a given bit rate R=K/T bits/s, and a given bit error rate $P_b$, an optimum combination of (K,L) can be determined for the design of the rate 1/L dual-K convolutional encoder which at the same time optimizes the code rate for an (n,k) Reed-Solomon encoder and obtains the maximum number of simultaneous symbols m by numerically solving equation (1) and (2). The result, m, reflects the maximum number of K-bit symbols at bit rate R that the system can handle during time T for a given bit error rate $P_b$. Note that statistical multiplexing is automatically achieved since the bit error rate calculation only depends on the number of colliding symbols m, not the total number of terminals connected M.

Numerical Example

Assume that the 3 dB modulation bandwidth of a semiconductor laser diode is W =30 Ghz (which is well below the theoretical limit on corner frequency for quantum well lasers and is within the capability of solder-based flip-chip packaging technology), the bit rate of all SONET stations is R=155.52 Mbps, and the required bit error rate is $P_b < 10^{-13}$ (this is more than adequate to satisfy a typical ATM QoS (quality of service) requirement of cell-loss-ration of $10^{-11}$). Using the procedure outlined above, optimum combinations of (K, L, m) can be determined that satisfy $$L = \text{Integer}\left[\frac{W}{R(n/k)} K 2^{-K}\right] \quad (3)$$

for a given (n,k) Reed-Solomon code. Results for a (255, k) Reed-Solomon code are obtained and shown in Table 1 of Appendix A. For the design of the Reed-Solomon encoder/decoder, an optimum (255, 217) code was found; for the rate 1/L dual-K encoder and Viterbi decoder, K=7 and L=9 were obtained and a value of m=103 is obtained for a $P_b=7.89 \times 10^{-14}$. Note that the search can be further improved with longer Reed-Solomon codes, but the (255, k) code was chosen because it is popular and commercially available as integrated circuits.

The above optimization results have several significant features. First, the result of K=7 means the construction of a Viterbi decoder is possible, since constraint length 7 Viterbi decoders are commercially available. It is also known, however, that Viterbi decoders with constraint length of 10 of above cannot currently be implemented with existing technology. Second, the result of L=9 indicates a close to unity entropy rate of K/L=0.78 bits/hop which is highly desirable. Third, the result of m=103 nearly doubles the 64 OC-3 capacity limit of OC-192 without resorting to pico-second electronics and optoelectronics. The actual number of OC-3 access stations linked to multiple access SONET ring is M=m/αβ. As crude approximation, assume that half of connected OC-3 stations are active on average, so α≈0.5. Further assume that β≈0.5 (this is justified since the major portion of traffic is voice which has an activity factor of 0.4.) The total number of connected stations is therefore M≈412. As would be understood, the above procedure can be used to design an access ring for any OC-N terminals, not just the OC-3 example shown above.

Operation and Management

As would be understood, the present invention of multiple access SONET needs to be managed to ensure a guaranteed QoS. Since the system bit error rate performance $P_b(K, L, n, k\ m)=P_b(7, 9, 255, 217, m)$ can be computed as a function of m, a call-admission policy can be established to ensure a predetermined bit error rate for all users. Traffic management can become complex but the analysis is straightforward. For example, real-time and quasi-real time applications are given higher priority in the transmit buffer, while non-real time applications such as electronic mail are buffered until the number of active users in the system has dropped below a threshold. All traffic management models designed for ATM can be applied here. Also, the generation of billing information, for example is extremely simple. Every terminal is billed according to the amount of interference power generated, because the total interference noise density is $$I_0 = (1/W) \sum_i P_i \quad (4)$$

where $P_i$ is the power transmitted by $i^{th}$ terminal. Because the bit signal-to-interference ratio $E_b/I_0$ ultimately determines the bit error rate, each terminal should therefore be billed for the its contribution to $I_0$.

A novel frequency hopped (FH) CDMA fiber optic system that supports random multiple access of high bit rate ATM/SONET access terminals has been disclosed. The concatenated coding scheme and MFSK channel signaling allows joint optimization of both the Reed-Solomon codec and dual K-codec. A performance analysis of the proposed system shows that the highest bit rate of the system at a baseband level is only 155.52×255/217=182.75 Mbps, which is much lower (54 times) than the OC-192 rate of 9.95328 Gpbs. The bit rate isolated between the encoder output and frequency synthesizer input is higher at 1.64 Gbps which is still much lower than 10 Gbps, as a result of rate 1/L dual-K encoding. But since this high bit rate is immediately used to generate frequency tones, and the process is performed entirely by isolated and localized high speed shift registers, the isolated high bit rate has no bearing on baseband bit rate or synchronized hop rate which is (L/K)R. The two important rates are (1) baseband bit rate =182.75 Mbps, and (2) subcarrier hop rate=235 Mbps/sec, and they are much easier to manage than a 10 Gbps baseband signal as in the TDMA case. In the above analysis, we assume that hops from all terminals are synchronized at the hop rate. If the synchronized hopping requirement is relaxed, the above result will be modified by a simple modification of the calculation p with $$p=1-(1-2^{-K})^{m-1}, \text{ synchronous hopping} \quad (5)$$

$$p=1-[1-(2^{1-K}-2^{-2K})]^{m-1}, \text{ asynchronous hopping.} \quad (6)$$

The interference dominated bit error rate of $P_b=7.89 \times 10^{-14}$ is low enough for typical ATM QoS requirements of cell-loss-ratio of less than $1 \times 10^{-11}$. Because the optical fiber is nearly noise-free and the performance of a FH-CDMA system is limited by mutual interference, the above analysis gives a good approximation of actual system performance. There are additional advantages with the disclosed FH-CDMA system. First, binary direct current modulation of a semiconductor laser at 10 Gbps is very difficult and a 10 Gbps receiver requires sophisticated equalization, making a OC-192 system difficult and expensive to build. The FH-CDMA system discussed above, in comparison, is based on subcarrier frequency hopped MFSK. An MFSK receiver, instead of detecting baseband digital pulses, detects frequency tones with high performance frequency detectors which are easy to build with tuned circuits and phase-locked loops. In the above system, the frequency tones used by all access stations are given by 30 Ghz/128=234.375 MHz and its multiple which can be generated by dedicated RF oscillators. Second, unlike TDMA based systems which require a central controller, every ATM terminal is equipped with a multiple access decoder and can serve as a network manager. The network will continue to function as long as the basic connection is maintained and the ATM terminals operating.

One other major difference between the present invention FH-CDMA approach and TDMA approach is that for a TDMA based system, a multiple access protocol typically allocates time slots in every cyclic superframe, and statistical multiplexing is achieved by carefully evaluating how many time slots a particular application needs at a given time. For an OC-192 system, therefore, a 10 Gbps central processor is required to police the traffic and dynamically allocate time slots on a priority basis. With current computer technology, this is clearly impractical. In the proposed FH-CDMA system, however, statistical multiplexing is a design feature, e.g., access terminals simply transmit whenever they wish—up to the system capacity limit, and no additional processor is needed.

Implementation

In order to implement the present invention, at the lowest physical layer, a semiconductor laser must be packaged to provide a 30 GHz flat frequency response. Although this is still difficult, new optoelectronic packaging methods can now produce laser packages that exhibit 10–30 GHz modulation corner frequencies. At the modem layer, there is the issue of the synthesis of frequency tones over a 30 GHz band. In the above example, there are $2^7=128$ frequency tones of $f_i=3000$ (i/128) MHz, (i=1, 2, . . . , 128). The spectral purity of these frequency tones is not particularly important, as long as they can be detected by the tone detectors in the receiver. One way of generating these frequency tones is use dedicated oscillators instead of a single voltage controlled oscillator. At the channel encoder and decoder layer, standard commercial products already exist that make (255, k) Reed-Solomon coding and constraint 7 convolutional coding possible.

It has been shown that it is possible to trade high bit rate in a TDMA system (e.g., OC-192) with low bit rate FH-CDMA signal processing subsystems for multiple access applications. The reduced bit rate in a FH-CDMA architecture provides significant benefits, for example: (1) Higher overall system reliability since lower bit rate electronic components consume less power and are more reliable, (2) Lower overall system cost since lower bit rate electronic components are much less expensive, (3) Higher system capacity as was demonstrated above in the comparison with OC-192, (4) Lower operation and management cost since existing low bit rate computer systems can be used to manage the multiple access ring, and finally, (5) The network is more robust than a TDMA network from the architecture point of view since timing only has to be maintained at a much lower bit rate and since the demise of any single terminal will not affect network management if all terminals are equipped to become network manager.

The present invention encoder, modulator, demodulator, decode combination can provide nearly error-free data communication with a bit error rate of less than or equal to that achieved by conventional TDMA systems. The bit rate of the CDMA processors (encoder, modulator, demodulators, decoder, etc.) is well below the bit rate of an OC-192 controller that is 10 Gbits/s. The reduced bit rate translates directly into a higher system reliability and lower system cost. Statistical multiplexing is accomplished by a design since in a CDMA system, the total system interference-noise floor is a linear sum of individual terminal's transmitted power. If any terminal becomes silent at a given time, a new terminal can be admitted into the network as long as the system interference-noise floor does not exceed a prespecified limit. Consequently, adding additional terminals will not disrupt network service at a time when the system interference-noise floor does not exceed the limit. The present invention uses a subcarrier modulation technique which is very similar to the current laser modulation scheme for cable-TV systems, and therefore can be retrofitted into an existing CATV system with low additional costs.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A code division multiple access (CDMA) transmit apparatus for transmitting data over a fiber-optic communications network, said CDMA transmitter apparatus coupled to a terminal device in said network, said apparatus comprising:

a concatenated encoder for coding said data from said terminal device and providing an address code representative of said terminal device, said encoder including:

means for sequentially segmenting said data from said terminal device into K-bit source symbols;

an (n,k) Reed Solomon encoder for mapping k of said K-bit symbols into n symbols; and a dual-K rate 1/L convolutional encoder for encoding each encoded K-bit symbol from said Reed-Solomon encoder into a total of L different K-bit symbols in a K-bit time period;

an adding device for modulo-$2^K$ adding each of said L different K-bit symbols from said convolutional encoder with said address-code; and a multiple frequency shift keying (MFSK) modulator for modulating encoded data from said adding device for transmission over said network, wherein terminal devices including said transmitter apparatus and coupled to said network transmit data signals at random over said network, said transmitter apparatus supporting multiple access of said fiber-optic communications network by said terminal devices.

2. The apparatus of claim 1, further including driver circuitry adapted to intensity modulate signals from said MFSK modulator for transmission over said fiber-optic network.

3. The apparatus of claim 2, wherein said driver circuitry includes a semiconductor laser adapted to provide a 30 Ghz flat response over a modulation bandwidth.

4. The apparatus of claim 1, further including a K-bit vector generator for randomly generating said address code.

5. The apparatus of claim 1, wherein said address code is randomly chosen over a Galois field ($2^K$).

6. The apparatus of claim 1, wherein said Reed-Solomon encoder is adapted to provide a (255,217) Reed-Solomon outer code and said convolutional encoder is adapted to provide a rate 1/9 dual-7 convolutional code.

7. The apparatus of claim 1, wherein said data from said terminal device is in the form of ATM cells adapted for use in an OC-3 SONET network.

8. The apparatus of claim 1 further including a receiver for receiving said data from said communications network, said receiver comprising:

an optical intensity detector for detecting a combined interference signal from said communications network;

frequency synthesizer demodulator including frequency tone detectors for demodulating an MFSK signal received from said optical intensity detector; and a decoder for recovering original data bits encoded by said concatenated encoder.

9. The apparatus of claim 8, wherein said decoder includes a Viterbi decoder and an (n,k) Reed-Solomon decoder adapted to recover baseband information in the form of said K-bit symbols.

10. The apparatus of claim 9, further including an adding device for modulo-$2^K$ adding signals from said frequency demodulator with signals from a random K-bit vector generator.

11. The apparatus of claim 1, wherein usage of said communications network is determinable according to the amount of interference power generated by each said terminal device.

12. The apparatus of claim 1, wherein said MFSK modulator is operable to generate frequency tones using dedicated oscillators.

13. A code division multiple access (CDMA) network for transmitting and receiving data over a fiber-optic media, said CDMA network including a plurality of terminal devices couple to said fiber optic media, wherein data signals from each of said terminal devices are transmitted at random over said network, each said terminal device including:

means for sequentially segmenting said data from said terminal device into K-bit source symbols;

an (n,k) Reed Solomon encoder for mapping k of said K-bit symbols into n symbols; and a dual-K rate 1/L convolutional encoder for encoding each encoded K-bit symbol from said Reed-Solomon encoder into a total of L different K-bit symbols in a K-bit time period;

an adding device for modulo-$2^K$ adding each of said L different K-bit symbols from said convolutional encoder with an address code;

a multiple frequency synthesizer shift keying (NFSK) modulator for modulating encoded data from said adding device for transmission over said network an optical intensity detector for detecting a combined interference signal from said communications network;

frequency synthesizer demodulator including frequency tone detectors for demodulating an MFSK signal received from said optical intensity detector; and a Viterbi decoder and an (n,k) Reed-Solomon decoder adapted to recover baseband information in the form of said K-bit symbols.

14. The network of claim 13, wherein said Reed-Solomon encoder is adapted to provide a (255,217) Reed-Solomon outer code and said convolutional encoder is adapted to provide a rate 1/9 dual-7 convolutional code.

15. A method for CDMA transmission of data over a fiber-optic communications network, said method comprising the steps of:

sequentially segmenting data from a terminal device in said network into K-bit source symbols;

mapping k of said K-bit symbols into n symbols by means of a Reed-Solomon encoder, encoding each encoded K-bit symbol from said Reed-Solomon encoder into a total of L different K-bit symbols in a K-bit time period using a dual-K rate 1/L convolutional encoder, adding an address code to an output of said convolutional encoder;

modulo-$2^K$ add each of said L different K-bit symbols from said convolutional encoder with an address code; and modulating data from said step of modulo-$2^K$ adding for transmission over said network, wherein data signals from terminal devices in said network are transmitted at random over said network, further wherein said step of modulating includes MFSK modulation and the step of intensity modulating signals from an MFSK modulator for transmission over said fiber-optic network.

16. The method of claim 15, further including the step of randomly generating said address code a K-bit vector generator.

17. The method of claim 15, wherein said Reed-Solomon code is a (255,217) Reed-Solomon outer code and said convolutional code is a rate 1/9 dual-7 convolutional code.

18. The method of claim 15, further including the steps of:

detecting a combined interference signal from said communications network;

demodulating an MFSK signal received from said step of detecting; and recovering baseband information in the form of said K-bit symbols using a Viterbi decoder and an (n,k) Reed-Solomon decoder.

19. The method of claim 15, wherein said data from said terminal device is in the form of ATM cells adapted for use in an OC-3 SONET network.

20. The method of claim 15, wherein usage of said communications network is determinable according to the amount of interference power generated by each said terminal device.

21. The method of claim 15, further including the step of hopping the subcarrier of a semiconductor laser diode over the entire range of a modulation band.

* * * * *